May 7, 1935.    C. W. TERRY    2,000,674
MEANS FOR REGULATING THE OUTPUT OF A GENERATOR
Filed July 27, 1934
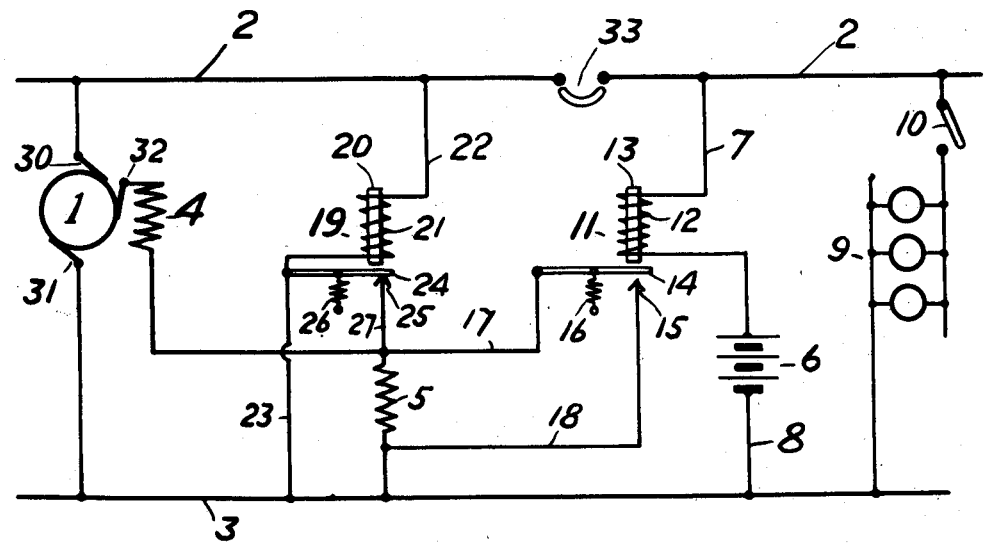
WITNESS:
INVENTOR
Charles W. Terry
BY
Augustus B S Houghton
ATTORNEY.

Patented May 7, 1935

2,000,674

UNITED STATES PATENT OFFICE 2,000,674

MEANS FOR REGULATING THE OUTPUT OF A GENERATOR

Charles W. Terry, Detroit, Mich., assignor to The Electric Storage Battery Company, Philadelphia, Pa., a corporation of New Jersey Application July 27, 1934, Serial No. 737,237

3 Claims. (Cl. 171—313)

The invention relates to systems in which a generator, which may be driven at variable speed, is employed to supply current to translation devices and to a storage battery. The invention is especially adapted for use in connection with the starting and lighting systems on automobiles driven by internal combustion engines.

In systems of this character on account of space and weight limitation, the capacity of the generator is usually designed with little, if any, surplus above the actual requirements, and, in order to utilize the generator capacity to the fullest possible extent, it should be so controlled that its maximum output is always delivered to the translation devices and to the storage battery except when the battery is so nearly fully charged that it is necessary, in order to avoid injurious overcharge, to reduce the output of the generator to avoid charging the battery at these excessive rates.

To accomplish this result, it is desirable to provide two somewhat different methods for controlling the output of the generator, put into operation selectively, depending upon the state of charge of the battery. When the battery is partly discharged and is in such condition that it can receive without injury any output that the generator is capable of giving, the generator control should be such that its full output will be delivered, this current being divided between the translation devices and the battery, the former taking such current as they require and the battery taking the balance in the form of charging current. In order to protect the generator against overload under these conditions, some form of current limiting control may be employed, designed to limit its output to the maximum safe value.

When the battery reaches a state of charge at which it is necessary to limit the charging current to avoid excessive charge, a second or supplementary method of control is introduced, designed to prevent the charging current into the battery from exceeding a certain predetermined value. This supplementary control, however, should be so designed that, when additional translating devices are connected, the output of the generator will be correspondingly increased to provide for this added load, thus maintaining the battery charging current at the same value.

In order to accomplish these results, I have provided the novel means for generator control illustrated diagrammatically in the accompanying drawing.

In the drawing 1 is a generator, here shown as of the third brush type, having main brushes 30 and 31 and an auxiliary or third brush 32 and having a field winding 4 connected between the third brush 32 and the main brush 31. In series with field winding 4 is shown a resistor 5. The generator 1 is connected across the circuit 2—3 to which are also connected the storage battery 6 by way of conductors 7 and 8 and the translation devices 9, the latter being adapted for connection to the circuit 2 by means of the switch 10. Interposed in the conductor 2, between the generator 1 and the battery and translating devices, is shown the cut-out switch 33, which may be of any well known design adapted to connect the generator to the battery when the generator voltage reaches the desired value and to disconnect it when its voltage drops below that of the battery.

When the resistor 5 is short-circuited, the characteristic of the generator 1 is similar to the usual third brush machine on an automobile, being controlled by its field winding and armature reaction so that its maximum output is substantially constant above a certain speed and is limited to the rated capacity of the machine. The value of the resistor 5 is such that, when it is in circuit with the field winding 4, it will so reduce the field excitation that the output of the generator will be limited to a value less than the maximum current to which it is desired to limit the charging rate into the battery.

In the drawing, the resistor 5 is arranged to be short-circuited by the contact 15 of the vibrating regulator 11 when that contact is closed in response to the pull of the spring 16. The regulator 11 comprises a magnetic core 13 surrounded by a coil 12 connected in series between the battery 6 and the conductor 2 by means of conductor 7. An armature 14 is arranged to be attracted by the core 13 against the pull of the spring 16 and to make contact with the contact 15 when the pull of the spring 16 predominates. When the contact 15 is closed, a circuit is established through conductors 17 and 18, short-circuiting the resistor 5. The vibrating regulator 11 operates in the well-known manner to maintain the current in the battery circuit substantially constant, opening the contact at 15 whenever the current exceeds this value, thus reducing the field excitation of the generator 1 and closing the contactor 15 whenever the battery current falls below this predetermined value, restoring the generator field excitation to its maximum value. So long as the generator is controlled by the vibrating regulator 11, the charging current into the battery will be maintained at the low rate desired when the battery is nearly fully charged. If translating devices are connected to the circuit by closing the switch 18, the output of the generator will be increased by the additional load due to these translating devices, for, if the generator output should not be increased by this amount, the charging current into the battery would fall off and the regulator 11 would act to increase the generator field excitation until the output of the generator is restored to a value equal to the load of the translating devices and the desired low rate charging current into the battery. If, however, this combined load should exceed the maximum capacity of the generator, its regulation due to the well-known characteristics of the third brush machine will prevent the output from equaling the sum of the load due to the translation devices and the predetermined battery charging current, and the latter will fall to a lower value.

19 is a voltage responsive relay arranged to cause the regulator 11 to be inoperative until the voltage across the circuit 2—3 has reached a certain predetermined value corresponding to that of the battery when approaching the fully charged condition. This relay 19 comprises a magnetic core 20 surrounded by a voltage coil 21 connected across the circuit 2—3 by means of conductors 22 and 23. It has an armature 24 normally held against the contact 25 by means of the spring 26. The contact 25 is in a circuit comprising conductors 23 and 27 which short-circuits the resistor 5 when the contact at 25 is closed. Under these conditions, the regulator 11 is inoperative and the generator is controlled to deliver its maximum rated output.

It will be understood that modifications may be made in the apparatus described above and shown in the accompanying drawing without departing from the spirit of the invention. For example, the generator 1 may be of the well-known shunt-wound type with its field controlled to give the desired regulation by means of a separate field regulator of one of the well-known types. Also, the voltage responsive relay 19 may be designed to compensate for variations in temperature by any of the well known means.

I do not intend to be limited save as the scope of the prior art and of the attached claims may require.

I claim:—

1. In combination, a generator provided with field regulation adapted to limit its maximum output to a predetermined value, a storage battery, means for connecting the battery to the generator, translating devices adapted to be connected to and disconnected from the battery and the generator, means responsive to current in the battery circuit but independent of current passing from the generator to the translating devices, said last-mentioned means adapted to limit the generator output to a value lower than said maximum, and means responsive to battery voltage and adapted to cause the battery current responsive means to be inoperative until the battery voltage rises to a predetermined value.

2. In combination, a generator, means for limiting the maximum output of said generator to a predetermined value, a storage battery, means for connecting the battery to the generator, translating devices adapted to be connected to and disconnected from the battery and the generator, means responsive to current in the battery circuit but independent of current passing from the generator to the translating devices, said last-mentioned means adapted to limit the generator output to a value lower than said maximum, and means responsive to battery voltage and adapted to cause the battery current responsive means to be inoperative until the battery voltage rises to a pretermined value.

3. An electric circuit, comprising in combination, a generator of the third brush type having the characteristic that its maximum output is substantially constant, a resistor, a storage battery, translating devices, connections between said storage battery and said translating devices and said generator, a switch controlling the connection between said storage battery and said translating devices and said generator, a second switch controlling the connection between said translating devices and said storage battery, a vibrating relay having a coil responsive to the current flowing through said battery and independent of the current flowing through said translating devices and having an armature controlling connections including said third brush and said resistor so that the maximum output of said generator is reduced when said connections are open, and a second relay having a voltage coil responsive to the voltage of said generator and having an armature controlling a connection paralleling said resistor and in series with said third brush.

CHARLES W. TERRY.